Figure 1:
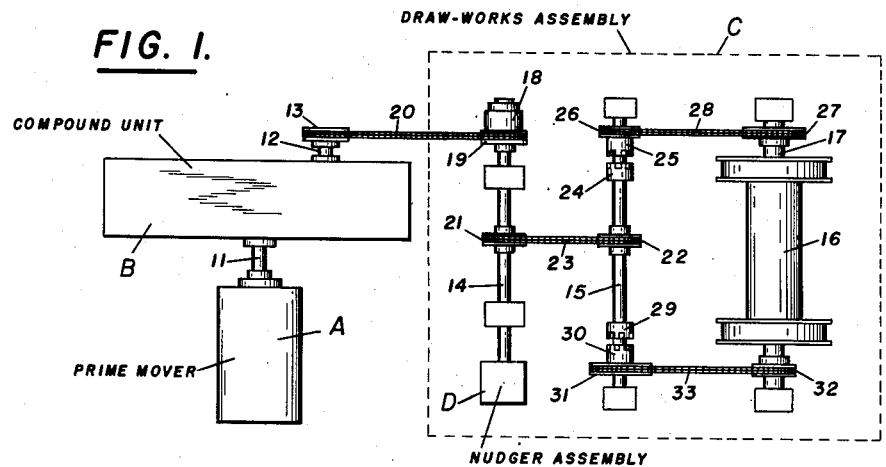

Feb. 9, 1954

R. R. CROOKSTON ET AL 2,668,450

DEVICE FOR GIVING ANGULAR MOTION WHEN SHIFTING JAW CLUTCHES

Filed Nov. 1, 1950

2 Sheets-Sheet 1

INVENTORS.
Robert R. Crookston,
Arthur L. Seljos,
BY
ATTORNEY.

Feb. 9, 1954    R. R. CROOKSTON ET AL    2,668,450
DEVICE FOR GIVING ANGULAR MOTION
WHEN SHIFTING JAW CLUTCHES
Filed Nov. 1, 1950    2 Sheets-Sheet 2

INVENTORS.
Robert R. Crookston,
Arthur L. Seljos,
BY
J. G. McKean
ATTORNEY.

Patented Feb. 9, 1954

2,668,450

UNITED STATES PATENT OFFICE 2,668,450

DEVICE FOR GIVING ANGULAR MOTION WHEN SHIFTING JAW CLUTCHES

Robert R. Crookston and Arthur L. Seljos, Houston, Tex., assignors, by mesne assignments, to Standard Oil Development Company, Elizabeth, N. J., a corporation of Delaware Application November 1, 1950, Serial No. 193,462

1 Claim. (Cl. 74—138)

This application is directed to a device for giving one jaw of a disengaged jaw clutch limited angular motion to assist in the proper engagement of the clutch when the two jaws are brought into contact.

In some machinery installations jaw clutches are used in the mechanical train which transmits power from the prime mover to the working tool. In order to allow the jaw clutches to be engaged without undue punishment, it is desirable that a small force give one of the jaws a relatively slow arcuate movement with respect to the other as the jaws are brought into engagement. If the prime mover used to transmit the power in installation has a minimum speed, it is not possible to use it for this purpose and thus it is necessary either to use the prime mover with its necessarily high rotative speeds for turning one of the jaws which is unsatisfactory in causing the punishment of the jaw elements or else to have the operation performed manually.

Figure 3:
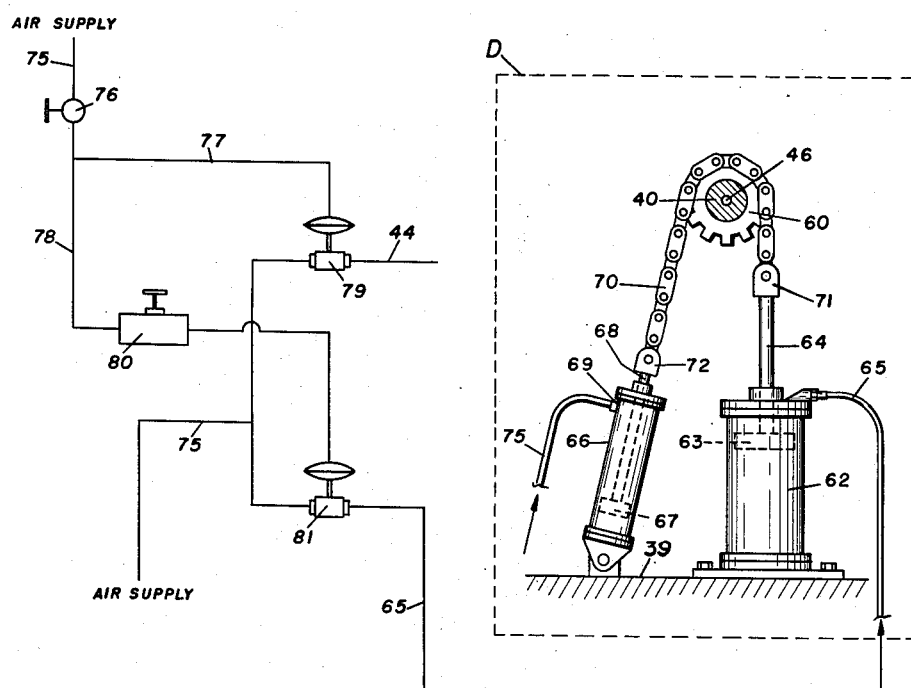
Figure 2:
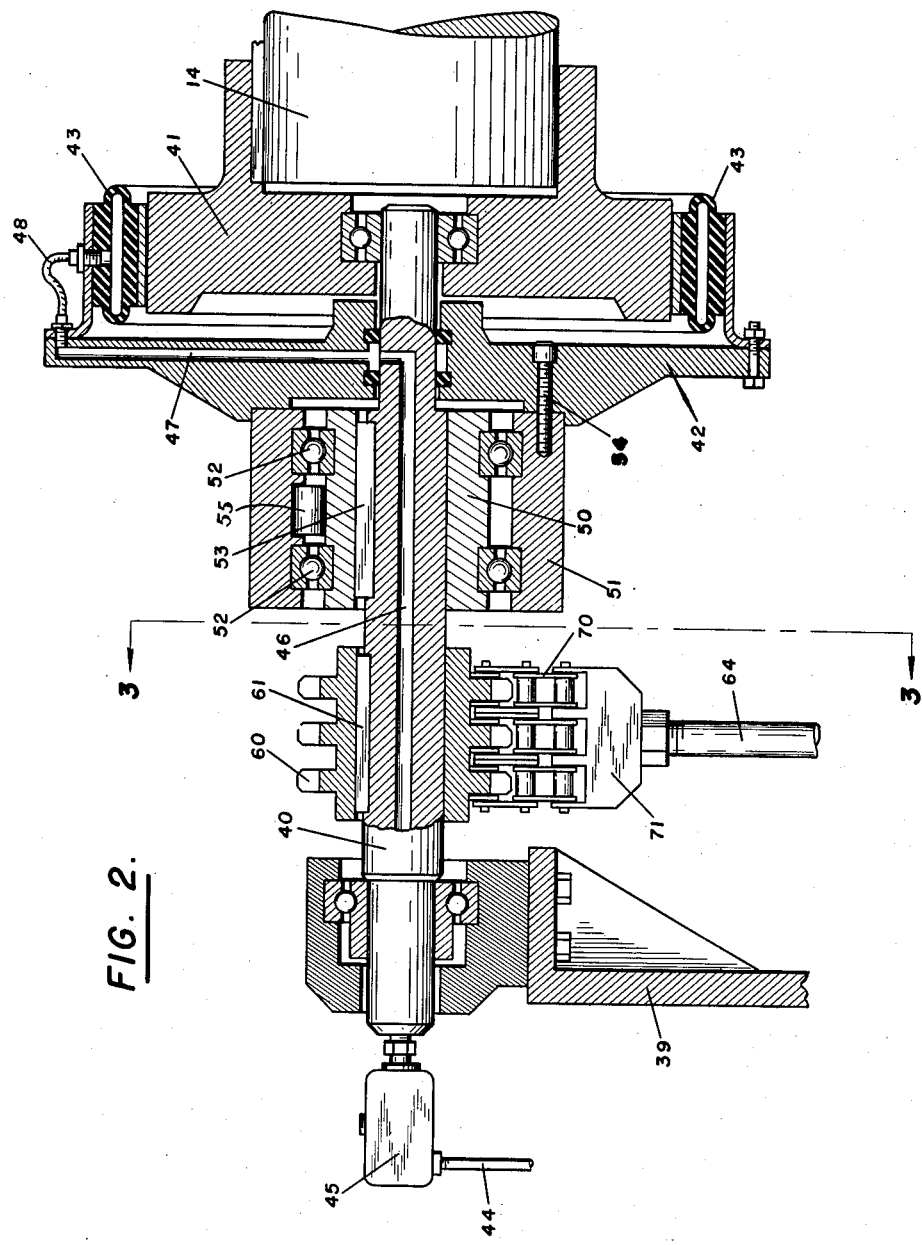

The present application is directed to a device for giving one jaw of a clutch limited movement with respect to the other jaw of a disengaged clutch in order to allow the smooth engagement of the clutch. Other advantages and objects of the present invention may be seen from the following description taken with the drawing in which Fig. 1 is a view partly in section showing an illustrative view of a rotary drilling rig;

Fig. 2 is an enlarged view partly in section of a portion of the device of Fig. 1 showing details of construction of an embodiment of the apparatus of the present invention; and Fig. 3 is a diagrammatic view taken along line 3—3 of Fig. 2 showing the control mechanisms for the device of Fig. 2.

Turning now specifically to the drawing and first to Fig. 1, the power supply consists of a prime mover A which may be for example a diesel engine. It is connected through a suitable drive shaft 11 to a compound unit B. The details of construction of the compound unit B are not shown except for a take-off power shaft 12 with a sprocket 13 for transmitting power to draw works assembly C. The draw works assembly is shown in somewhat simplified form with a jack shaft 14, line shaft 15 and drum 16 mounted on a drum shaft 17. Jack shaft 14 has a friction clutch 18 carrying a sprocket 19 mounted on its end and arranged to receive power through drive chain 20 from compound unit B. Jack shaft 14 has a sprocket 21 mounted thereon which transmits power to a corresponding sprocket 22 mounted on the line shaft through drive chain 23. A pair of jaw clutches are mounted on line shaft 15. One pair for the low speed drive of the drum 16 consists of jaw 24 fixed to shaft 15 and jaw 25 to be engaged or disengaged with jaw 24 and carrying a sprocket 26 which transmits power to sprocket 27 mounted on drum shaft 17 by means of drive chain 28. The other jaw clutch which is the high speed drive for the drum consists of jaw 29 secured to the line shaft and jaw 30 arranged to be engaged and disengaged therewith and carrying sprocket 31 which is arranged to transmit power to sprocket 32 mounted on the drum shaft 17 by means of drive chain 33.

An assembly D in accordance with the present invention is mounted for cooperation with jack shaft 14.

It is to be understood that the showing of the prime mover compound unit and draw works is for illustrative purposes only. In a heavy duty drilling rig it is customary to provide 2 or 3 internal combustion engines as the prime movers when this source of power is used and in a draw works it is customary to have more complicated apparatus, for example, a sand reel in addition to the drum. However, the apparatus shown illustrates the principles involved, namely, the jaw clutches are in the power train transmitting power from the prime mover to the work unit and that it is desirable to provide a means for giving a shaft limited angular motion in order to aid in the shifting of jaw clutches in such an assembly.

The details of construction of unit D are shown in Figs. 2 and 3. A frame 39, which may be the frame of the draw works, is provided as a mounting means. A stub shaft 40 is mounted concentric with jack shaft 14. A friction clutch assembly is provided for connecting and disconnecting shaft 40 with jack shaft 14. This clutch consists of a hub 41 fixed to jack shaft 14 and a casing 42 fixed to shaft 40 with a compressed air operated friction unit 43 fixed to casing 42 and adapted to be expanded into frictional contact with hub 41. Compressed air for actuating the clutch is supplied through an inlet line 44 which passes through a seal 45 to axial passage 46 in shaft 40, the axial passage connecting with a radial passage 47 in casing 41 and thence through connection 48 to the friction unit 43.

Mounted on shaft 40 is an overrunning clutch consisting of hub 50, casing 51 and bearing balls 52. Hub 50 is secured to shaft 40 through key 53. Power transmitting rollers 55 are arranged between hub 50 and casing 51 to transmit power from hub 50 to casing 51. Casing 51 is secured to member 42 of the friction clutch by screws 54. Since an overrunning clutch is well known to the art, the specific details of construction of this device will not be given. It is believed sufficient to state that when casing 51 is rotated in a clockwise direction (as when looking at the end of shaft 40 provided with a seal 45) at a greater speed than shaft 40 it rotates independently of shaft 40 but when shaft 40 (carrying hub 50 with it) rotates at a greater speed in a clockwise direction than casing 51, the hub drives casing 51 through balls 52.

A sprocket 60 is mounted on shaft 40 and is fixed thereto by key 61. Mounted below sprocket 60 and secured to frame 39 is a power unit consisting of cylinder 62 and piston 63 with a piston rod 64 secured thereto and extending through the head end of the cylinder. A return unit consisting of cylinder 66, piston 67 and piston rod 68 secured thereto is also attached to frame 39 with piston rod 68 parallel with piston rod 64. A compressed air inlet line 69 leads into the head end of cylinder 66 of the return unit. A drive chain 70 engages with said sprocket 60 with one end secured to piston rod 64 of the power unit by means of head 71 and the other end connected to piston rod 68 of the return unit by head 72.

A suitable control mechanism for the device is shown in Fig. 3. Compressed air is supplied from suitable means, not shown in the drawing, to air inlet lines which, for convenience, are all designated 75 on the drawing. For controlling the operation a valve of the bleeder type 76 controls the admission of air into two branches 77 and 78. Branch 77 leads to the diaphragm of normally closed diaphragm valve 79 which controls the admission of air through air inlet 44 to the air operated clutch. Branch 78 has a time delay unit 80 arranged therein and is connected to the diaphragm of normally closed diaphragm valve 81 which controls the admission of air to air inlet line 65 of power unit. The return air cylinder 66 is supplied with air continuously from air inlet line 75.

When using the device of the present invention it may be assumed that it is desired to engage either the jaws 29 and 30 of the low speed drive for the drum or the jaws 24 and 25 of the jaw clutch assembly for the high speed drive. In either event these clutches may be engaged properly by giving jack shaft 14 limited angular movement while it is disengaged from the compound unit. Thus with the jack shaft master clutch 18 disengaged, jack shaft 14 is given angular movement by assembly D. This movement is produced simply by opening valve 76 in the air control system which allows compressed air to pass to the diaphragm of valve 79 which opens this normally closed valve so that air passes through line 44 to the clutch unit 43 which mechanically connects shaft 40 to jack shaft 14. Opening valve 76 also allows air to flow through branch 78 and through time delay unit 80 and to the diaphragm of normally closed diaphragm valves 81 so that air can pass from air inlet line 75 through line 65 into the cylinder of the power unit. This forces the piston 63 downwardly and the movement is transmitted through piston rod 64, head 71 and drive chain 70 and sprocket 60 to shaft 40 giving the shaft angular movement. As the shaft moves either the jaw elements 24, 25 or 29, 30 may be engaged in the manner conventional to the art. As soon as the jaw elements are engaged the master clutch 18 may be engaged and power is then transmitted from the prime mover A to the drum 16. As soon as the selected jaw clutch is engaged valve 76 may be closed and since this valve is of the bleeder type it bleeds out air from the air control lines causing valves 79 and 81 to close. Since valves 79 and 81 are also of the bleeder type, they bleed out the air from the clutch unit 43 and from the power cylinder 62. This causes the clutch unit 43 to disengage and allows the jack shaft 14 to rotate independently of unit D while air bleeding from cylinder 62 of the power unit reduces the pressure in this unit and allows the air pressure in cylinder 66 of the return unit to force piston 67 therein downwardly which in turn returns sprocket and piston 63 of the power unit to their initial positions.

While we have disclosed a specific embodiment of the present invention, it will be apparent to a workman skilled in the art that various changes in the size and shapes of the several parts may be made without departing from the scope of the invention.

Having fully disclosed and illustrated the present invention, what we desire to claim as new and useful and to secure by Letters Patent is:

A device for giving limited angular rotation to a first shaft comprising, in combination, a second shaft concentric with the first shaft, a compressed air operated friction clutch releasably connecting the first and second shafts, an overriding clutch mounted on a second shaft, a sprocket mechanically connected with one element of said overriding clutch, a base member, a drive chain engaging with the teeth of the sprocket, a power unit and a return unit each having a cylinder as one element and a piston with piston rod attached thereto slidably arranged in the cylinder as another element, one element of each unit being secured to said base member and the other elements of said units being secured to opposite ends of said drive chain, the piston of said return unit being of substantially less area than the piston of said power unit, a first compressed air inlet line controlled by a first bleeder-type valve with compressed air control means connected to said compressed air operated friction clutch, a second compressed air line controlled by a second bleeder-type valve with compressed air control means to the cylinder of said power unit and a third compressed air line controlled by a third bleeder-type valve connected through a first branch to the compressed air control means of said first bleeder-type valve and through a second branch provided with a time delay unit to the compressed air control means of said second bleeder-type valve and a fourth compressed air inlet line connected to the cylinder of the return unit.

ROBERT R. CROOKSTON.
ARTHUR L. SELJOS.

References Cited in the file of this patent

UNITED STATES PATENTS

| Number | Name | Date |
|---|---|---|
| 1,106,930 | Desmond | Aug. 11, 1914 |
| 1,142,889 | Knapp | June 15, 1915 |
| 1,476,703 | Forman | Dec. 11, 1923 |

FOREIGN PATENTS

| Number | Country | Date |
|---|---|---|
| 15,467 | Great Britain | July 7, 1906 |
| 116,567 | Germany | Oct. 8, 1899 |